United States Patent
Chen et al.

(10) Patent No.: US 9,970,672 B2
(45) Date of Patent: May 15, 2018

(54) TEMPERATURE CONTROL SYSTEM AND TEMPERATURE CONTROL METHOD

(71) Applicant: DELTA ELECTRONICS, INC., Taoyuan County (TW)

(72) Inventors: Meng-Seng Chen, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 246 days.

(21) Appl. No.: 14/935,671

(22) Filed: Nov. 9, 2015

(65) Prior Publication Data

US 2016/0161140 A1    Jun. 9, 2016

(30) Foreign Application Priority Data

Dec. 4, 2014   (TW) .............................. 103142098 A

(51) Int. Cl.
  *F24F 11/00*    (2018.01)
  *G05D 23/19*   (2006.01)
  *F25B 49/02*    (2006.01)

(52) U.S. Cl.
  CPC ........ *F24F 11/0012* (2013.01); *F24F 11/006* (2013.01); *F25B 49/02* (2013.01);
  (Continued)

(58) Field of Classification Search
  CPC ................. F24F 11/0012; F24F 11/006; F24F 2011/0064; F24F 2011/0075;
  (Continued)

(56) References Cited

U.S. PATENT DOCUMENTS 7,886,985 B2   2/2011  Moore et al.
2005/0005621 A1   1/2005  Jayadev
(Continued)

FOREIGN PATENT DOCUMENTS

CN   100476314   4/2009
CN   203163157   8/2013
(Continued)

OTHER PUBLICATIONS

Prestige Touch Screen Thermostat: User Guide, 2012, Honeywell International Inc., pp. 1-41.*
(Continued)

*Primary Examiner* — Mark Connolly
(74) *Attorney, Agent, or Firm* — Hauptman Ham, LLP

(57) ABSTRACT

A temperature control method used for changing a current temperature of an indoor space to a target temperature in a target time comprises following steps: retrieving the target time, the target temperature and an operation data of an indoor apparatus; retrieving an environmental factor; retrieving the current temperature of the indoor space via a temperature sensor; calculating an operation strategy according to the target time, the target temperature, the operation data, the environmental factor and the current temperature; executing the operation strategy to control the indoor apparatus to switch between multiple operation modes. This application uses a better energy-saving way to adjust the temperature of the indoor space to achieve the target temperature in the target time.

18 Claims, 6 Drawing Sheets

(52) U.S. Cl.
CPC ..... *G05D 23/1904* (2013.01); *G05D 23/1917* (2013.01); *G05D 23/1919* (2013.01); *F24F 2011/0064* (2013.01); *F24F 2011/0075* (2013.01)

(58) Field of Classification Search
CPC ........... G05D 23/1904; G05D 23/1917; G05D 23/1919; F25B 49/02
See application file for complete search history.

(56) References Cited

U.S. PATENT DOCUMENTS

| | | |
|---|---|---|
| 2007/0084942 A1 | 4/2007 | Moore |
| 2009/0301116 A1 | 12/2009 | Nathan et al. |
| 2013/0317654 A1 | 11/2013 | Kashirajima et al. |
| 2015/0219356 A1 | 8/2015 | Ito et al. |
| 2015/0276239 A1* | 10/2015 | Fadell ................ G05D 23/1905 237/2 A |
| 2016/0228640 A1* | 8/2016 | Pindado ............. A61N 1/36139 |

FOREIGN PATENT DOCUMENTS

| | | |
|---|---|---|
| JP | S629137 | 1/1987 |
| JP | S6423049 | 1/1989 |
| JP | H02146447 | 6/1990 |
| JP | S63161338 | 7/1998 |
| TW | 201437980 | 10/2014 |
| WO | WO2014017316 | 1/2014 |
| WO | WO20140838011 | 6/2014 |

OTHER PUBLICATIONS

Office Action dated Sep. 27, 2016 from corresponding application No. JP 2015-227946.
Office Action dated Dec. 2, 2015 from corresponding application No. TW 103142098.
Office Action dated Jul. 11, 2017 from corresponding application No. CN 201410733694.X.
European Search Report dated May 24, 2016 from corresponding application No. EP 15195245.4.

* cited by examiner

TEMPERATURE CONTROL SYSTEM AND TEMPERATURE CONTROL METHOD

BACKGROUND OF THE INVENTION

Field of the Invention

The technical field relates to temperature control and more particularly related to temperature control system and temperature control method changing a temperature of an indoor space to a target temperature within a target time.

Description of Related Art

Please refer to the FIG. 1, which is a schematic view of temperature variation of an operating temperature control system according to the related art. As shown in FIG. 1, a main object of a temperature control system of the related art is to control a temperature T1 of an indoor space to fast achieve and continuously maintain a target temperature T2. For achieving the object, the temperature control system of the related art performs the cooling operation with a higher operation power after the temperature control system is started up. Via producing large amounts of cold air that has a temperature lower than the target temperature T2 and mixing the temperature T1 of the indoor space and the cold air, the temperature control system of the related art can fast reduce the temperature T1 to achieve the target temperature T2.

However, the aforementioned solution that performs the cooling operation with a higher operation power will cause an increase of power consumption. As a result, the temperature control system of the related art actually increases a cost of using the power paid by the user. Furthermore, the aforementioned solution doesn't completely consider the actual requirements of the user.

For example, the user may only want to achieve the requirement of changing the temperature T1 of the indoor space to achieve the target temperature T2 within a predetermined time T (such as 5 minutes). However, because the temperature control system of the related art performs the cooling operation with the higher operation power, the temperature control system could early change the temperature T1 of the indoor space to achieve the target temperature T2 within the time TA (such as 3 minutes).

In summary, the user never care about waiting the predetermined time T or the shorter time TA to change the temperature T1 to the target temperature T2. The user pays more attention to the increase of the cost of using the power caused by early changing the temperature T1 to the target temperature T2.

Therefore, the temperature control system of the related art doesn't completely consider the actual requirements of the user. There is a need to find out a better and more effective solution to handle such problems.

SUMMARY OF THE INVENTION

The object of the present disclosed example is to provide a temperature control system and a temperature method changing a temperature of an indoor space to a target temperature within a target time.

Another object of the present disclosed example is to achieve above object via a better energy-saving way.

One of the exemplary embodiments, a temperature control system changing a temperature of an indoor space to a target temperature within a target time, the temperature control system comprising: an indoor apparatus adjusting the temperature of the indoor space, the indoor apparatus being operable in a plurality of operation modes respectively corresponding to a plurality of operation powers; a temperature sensor sensing a current temperature of the indoor space; and a control apparatus connected to the indoor apparatus and the temperature sensor executing a operation strategy calculation procedure to calculate an operation strategy according to the target time, the target temperature, an operation data of the indoor apparatus, the current temperature and an environmental factor, and executing the operation strategy to control the indoor apparatus to switch a current mode of the indoor apparatus between the operation modes for minimizing a total operation power that the indoor apparatus consumes within the target time.

One of the exemplary embodiments, a temperature control method changing a temperature of an indoor space to a target temperature within a target time, the temperature control method comprising: a) retrieving the target time, the target temperature and a operation data of an indoor apparatus, wherein the indoor apparatus being operable in a plurality of operation modes respectively corresponding to a plurality of operation power; b) retrieving an environmental factor; c) retrieving a current temperature of the indoor space; d) calculating an operation strategy according to the target time, the target temperature, the operation data, the environmental factor and the current temperature, wherein the operation strategy is used for minimizing a total operation power that the indoor apparatus consumes within the target time; and e) executing the operation strategy to control the indoor apparatus to switch a current mode of the indoor apparatus between the operation modes.

One of the exemplary embodiments, a temperature control method changing a temperature of an indoor space to a target temperature in a target time, the temperature control method comprising: a) retrieving the first target time, the target temperature and a operation data of an indoor apparatus, wherein the indoor apparatus being operable in a plurality of operation modes respectively corresponding to a plurality of operation power; b) retrieving a first environmental factor; c) retrieving a first current temperature of the indoor space; d) calculating an operation strategy according to the first target time, the target temperature, the operation data, the first environmental factor and the first current temperature, wherein the first operation strategy is used for minimizing a total operation power that the indoor apparatus consumes within the first target time; e) executing the operation strategy to control the indoor apparatus to switch a current mode of the indoor apparatus between the operation modes; f) calculating a remaining time according to an interval time and the first target time after the interval time elapses and the first target time doesn't elapse; g) calculating a second environmental factor after the step f); h) retrieving a second current temperature after the step f); i) making the remaining time as a second target time; and j) re-performing the step d) to calculating a second operation strategy according to the second environmental factor, the second current temperature and the second target time.

The present disclosed example calculates a best operation strategy according to a plurality of parameters, and executes the calculated operation strategy to control the indoor apparatus to switch the current operation mode. In this way, the present disclosed example can uses a better energy-saving way to change a temperature of an indoor space to a target temperature within a target time.

DETAILED DESCRIPTION OF EMBODIMENT

In the following description, a preferred embodiment is explained with associated drawings.

Figure 1A:
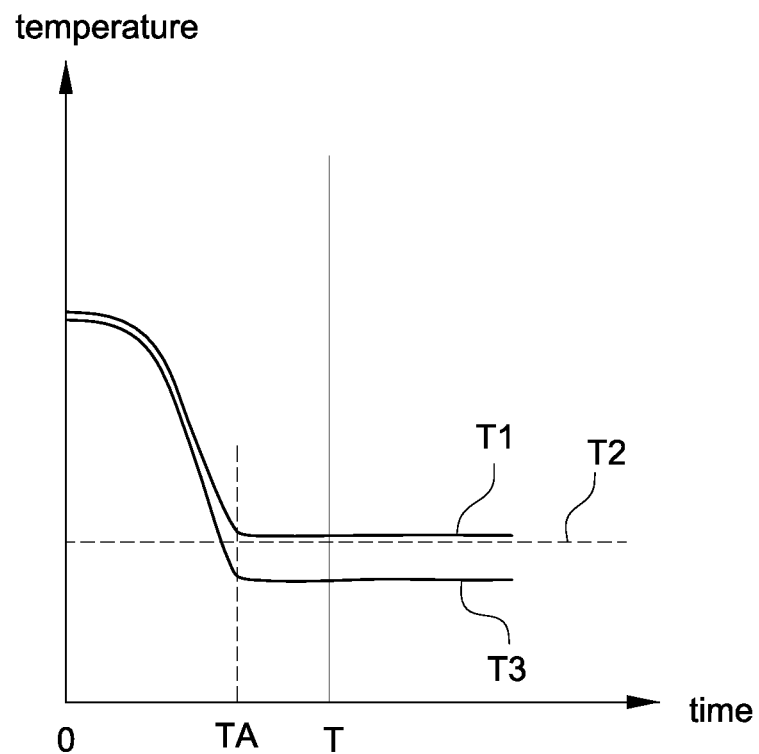
FIG. 1A is a schematic view of temperature variation of an operating temperature control system according to the related art.
Figure 1B:
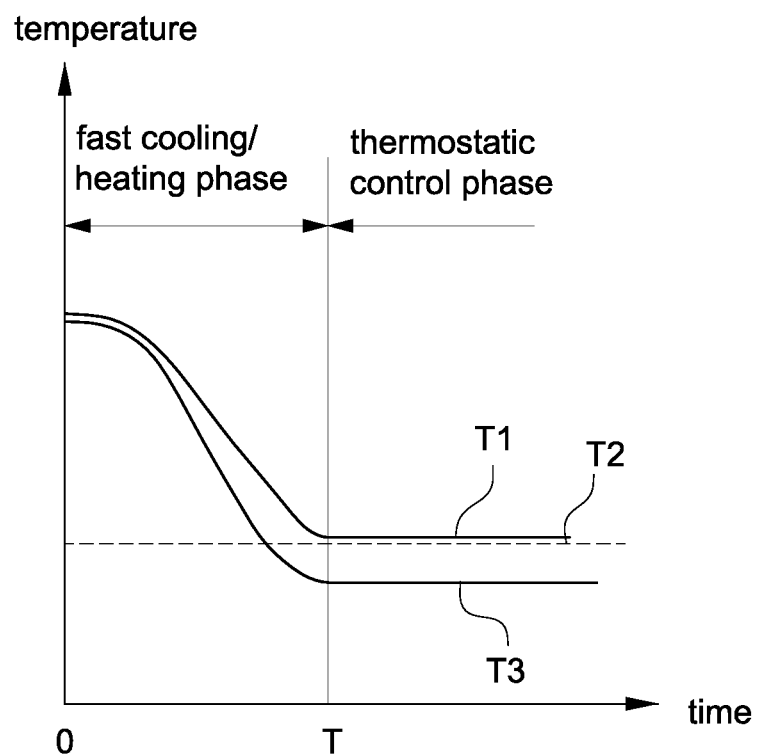
FIG. 1B is schematic view of temperature variation of an operating temperature control system according to a first embodiment of the present disclosed example.

First, please refer to the FIG. 1B which is schematic view of temperature variation of an operating temperature control system according to a first embodiment of the present disclosed example. FIG. 1B is used to describe the object and usage scenario of the present disclosed example.

An operation process of a temperature control system of the present disclosed example (as the temperature control system 2 shown in FIG. 2) can be divided into two operation phases. One is the fast cooling/heating phase, another is thermostatic control phase. In following description, we will take the cooling operation for example to respectively explain the detail of the temperature control system operating in the fast cooling/heating phase or the thermostatic control phase.

In the fast cooling/heating phase, the main object of the temperature control system 2 is to change an indoor temperature T1 to a target temperature T2 in a predetermined time. For achieving above object, the temperature control system 2 needs to strategically perform the cooling operation in the fast cooling/heating phase. Via appropriately producing the cold air that has a temperature lower than the target temperature T2 and mixing the indoor air having the temperature T1 and the cold air, the temperature control system 2 can reduce the temperature T1 to the target temperature T2 within the predetermined time T.

In the thermostatic control phase, the main object of the temperature control system 2 is to stably maintain the indoor temperature T1 at the target temperature T2. For achieving above object, the temperature control system 2 stably maintains the indoor temperature T1 at the target temperature T2 via stably producing the cold air having an outlet air-flowing temperature T3.

The main object of this present disclosed example is to make the temperature control system 2 change the indoor temperature T1 to achieve the target temperature T2 within the predetermined time T in the fast cooling/heating phase via operating with the most energy saving way.

The following description is used to explain the technical means used by this present disclosed example for achieving above object.

Figure 2:
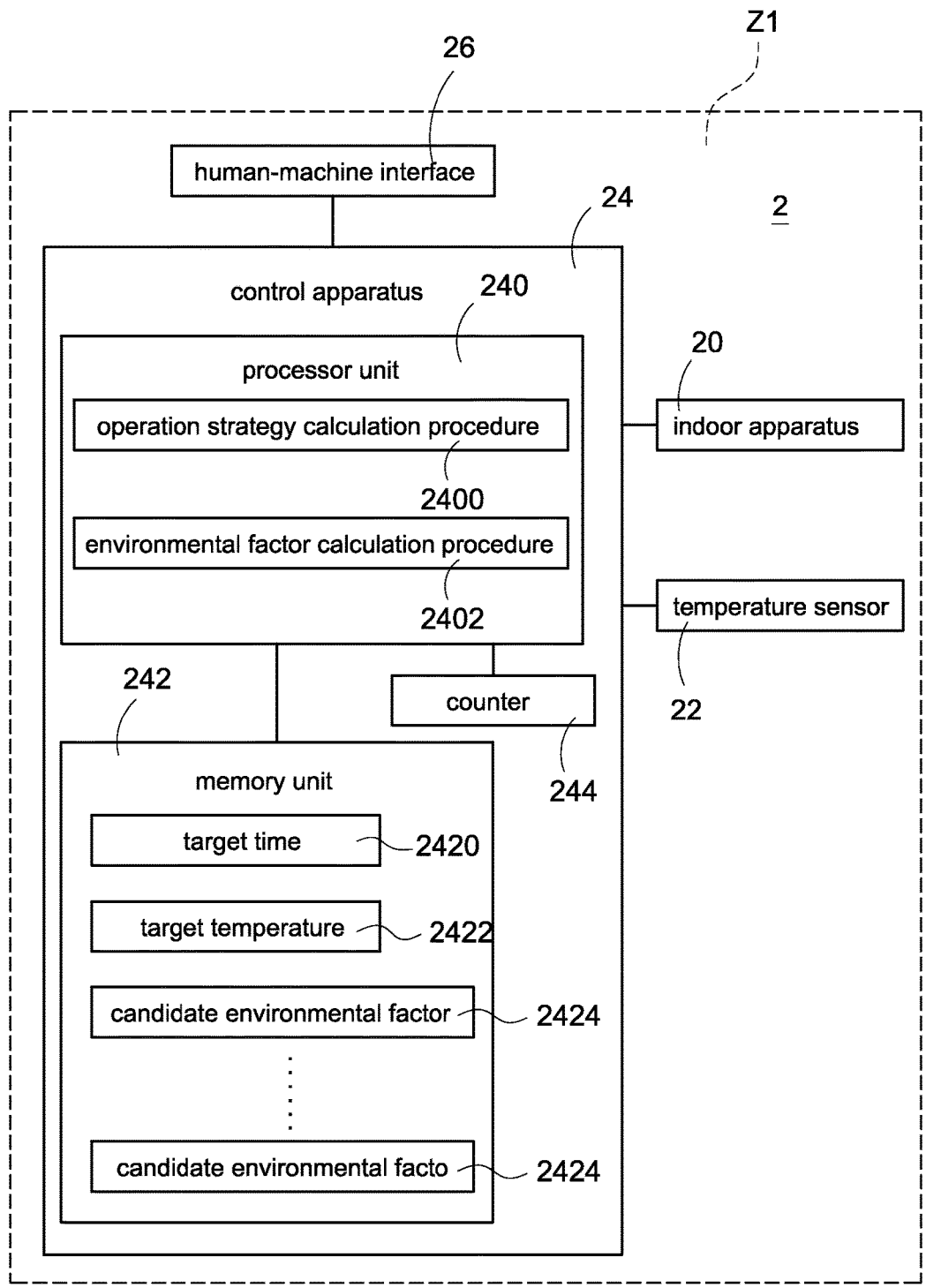
FIG. 2 is an architecture diagram of a temperature control system according to a first embodiment of the present disclosed example.

Next, please refer to FIG. 2 which is an architecture diagram of a temperature control system according to a first embodiment of the present disclosed example. As shown in FIG. 2, the temperature control system 2 of the present disclosed example mainly comprises an indoor apparatus 20, a temperature sensor 22 and a control apparatus 24. The temperature control system 2 is used in an indoor space Z1 to change the temperature of the indoor space Z1 to a target temperature 2422 within a target time 2420.

The indoor apparatus 20 is an apparatus used to adjust the temperature of the indoor space Z1 (such as air conditioner, heater, fan or cold water valve). Preferably, the indoor apparatus 20 is controlled to operate by the control apparatus 24 for adjusting the temperature of the indoor space Z1 to the target temperature 2422.

The indoor apparatus 20 can be operated under a plurality of operation modes. Each mode is respectively corresponded to an operation power and a temperature-adjusting capability value. More specifically, the operation power and the temperature-adjusting capability value are directly proportional. Preferably, the operation power is the power consumption per time unit (such as kilowatt per hour (KWH)) of the indoor apparatus 20 operating under the specific operation mode. The temperature-adjusting capability value is the absorbed calorific capacity (in the cooling operation) or the generated calorific capacity (in the heating operation) of the indoor apparatus 20 operating under the specific operation mode (such as British Thermal Unit (BTU)). In another embodiment, the temperature-adjusting capability value is the reduced temperature value (in the cooling operation) or the increased temperature value (in the heating operation) of the indoor apparatus 20 operating under the specific operation mode (such as Celsius temperature (° C.)). Preferably, the temperature-adjusting capability value is respectively a difference value between an intake air-flowing temperature and an outlet air-flowing temperature of the indoor apparatus 20 operating under each mode.

Take the indoor apparatus 20 as a fan for example. The indoor apparatus 20 can being operable in a small wind speed mode, a medium wind speed mode and a large wind speed mode. The operation power and the temperature-adjusting capability value corresponding to the small wind speed mode are lowest. In other words, when the indoor apparatus 20 operates under the small wind speed mode, although the power consumption per hour of the indoor apparatus 20 is lowest (most energy saving mode), the cooling capacity of the indoor apparatus 20 is worst. The medium wind speed mode is followed. The operation power and the temperature-adjusting capability value corresponding to the large wind speed mode are most. In other words, when the indoor apparatus 20 operates under the large wind speed mode, although the power consumption per hour of the indoor apparatus 20 is most (most energy consumption mode), the cooling capacity of the indoor apparatus 20 is best.

The temperature sensor 22 is used to sense a current temperature of the indoor space Z1 and transfer the sensed current temperature to the control apparatus 24 for subsequent processing.

The control apparatus 24 is connected to the indoor apparatus 20 and the temperature sensor 22. The control apparatus 24 can be electrically connected to the indoor apparatus 20 and the temperature sensor 22 via at least one transmission cable, or the control apparatus 24 can establish a wireless network connection with the indoor apparatus 20 and the temperature sensor 22 via a network, but this specific example is not intended to limit the scope of the disclosed example.

The control apparatus 24 mainly comprises a processor unit 240 and a memory unit 242. The memory unit 242 electrically connected to the processor unit 240 stores the target time 2420 and the target temperature 2422. The processor unit 240 can retrieve the current temperature of the indoor space Z1 via the temperature sensor 22, and execute an operation strategy calculation procedure 2400 to calculate an operation strategy. Then the processor unit 240 executes the calculated operation strategy to control the indoor apparatus 20 to switch a current mode of the indoor apparatus 20 between the operation modes for minimizing a total operation power that the indoor apparatus consumes within the target time 2420.

More specifically, the operation strategy calculation procedure 2400 can calculate the operation strategy according to the target time 2420, the target temperature 2422, an operation data of the indoor apparatus 20, the current temperature and an environmental factor. The operation data can comprise the operation powers and the temperature-adjusting capability values of the indoor apparatus 20 respectively operating under the operation modes.

Preferably, the operation strategy comprises a plurality of the time values respectively corresponded to a plurality of operation time that the indoor apparatus 20 operates under each operation mode. A sum of the time values is not greater than the target time 2420

Taking a fan as an example for the indoor apparatus 20, the indoor apparatus 20 can be operated under a small wind speed mode, a medium wind speed mode and a large wind speed mode. The target time 2420 is 300 seconds. The operation strategy calculated by the processor unit 240 can comprise the multiple operation time of the small wind speed mode (taking 100 seconds for example), the operation time of the medium wind speed mode (taking 50 seconds for example) and the operation time of the large wind speed mode (taking 150 seconds for example). When the control apparatus 24 executes the operation strategy, the control apparatus 24 first controls the indoor apparatus 20 to operate under the large wind speed mode for 150 seconds, secondarily controls the indoor apparatus 20 to operate under the medium wind speed mode for 50 seconds, and finally controls the indoor apparatus 20 to operate under the small wind speed mode for 100 seconds. Thus, after the indoor apparatus 20 controlled by the control apparatus 24 operates for the target time 2420, the indoor apparatus 20 can change the temperature of the indoor space Z1 to the target temperature 2422.

The environmental factor is a quantized value generated by quantizing a heating status of the factors possible to effect the temperature of the indoor space Z1, such as the number of the peoples entering the indoor space Z1 or the volume size of the indoor space Z1. Preferably, the processor unit 240 executes an environmental factor calculation procedure 2402 to calculate the environmental factor. More particularly, the environmental factor calculation procedure 2402 can calculate the environmental factor according to above described heating status.

In this embodiment, the environmental factor is retrieved via executing the environmental factor calculation procedure 2402, but this specific example is not intended to limit the scope of the disclosed example. In another embodiment of the disclosed example, the memory unit 242 further stores a plurality of the candidate environmental factors 2424. The control apparatus 24 selects one of the candidate environmental factors 2424 as the environmental factor to calculate the operation strategy. In this embodiment, those candidate environmental factors 2424 can be respectively corresponded to a plurality of executing times (executing occasions), such as summer, winter, noon or evening.

Preferably, those candidate environmental factors 2424 are respectively generated by the difference prior executing experiences. In other words, every time the temperature control system 2 completes the execution of the cooling/heating operation (namely, the temperature of the indoor space Z1 achieves the target temperature 2422), the temperature control system 2 can calculate the candidate environmental factor 2424 according to the executed operation strategy, the target time 2420, the target temperature 2422 and the operation data, and store the calculated candidate environmental factor 2424 to the memory unit 242 as the environmental factor used to calculate the operation strategy in next time. Thus, the temperature control system 2 of this embodiment can have a learning function of automatically selecting the most suitable environmental factor.

In another embodiment of the disclosed example, those environmental factors 2424 is pre-configured and stored to the memory unit 242 by the user.

In another embodiment of the disclosed example, the control apparatus 24 further comprises a counter 24. The counter 24 is used to count an interval time. Every time the interval time elapses, the processor unit 24 re-executes the environmental factor calculation procedure to calculate the new environmental factor, calculates a remaining time according to the interval time and the target time 2420, sets the remaining time as the new target time 2420, and re-executes the operation strategy calculation procedure 2400 to re-calculate the new operation strategy according to the new environmental factor and the new target time 2420 in which the interval time and the remaining time are less than the target time 2420. Thus, the temperature control system 2 of this embodiment can have a real-time correction function to real-time correct the operation strategy in response to the change of the heating status of the indoor space Z1 (such as a large number of peoples suddenly enter to the indoor space Z1) in the process of executing the cooling/heating operation. The temperature control system 2 of this embodiment can ensure that the temperature of the indoor space Z1 achieves the target temperature 2422 within the target time 2420.

In another embodiment of the disclosed example, the temperature control system 2 further comprises a human-machine interface 26 (such as touchscreen or button) operatively connected to the control apparatus 24. The human-machine interface 26 receives an input operation that inputs the target time 2420 and the target temperature 2422 from the user, and transfers the inputted target time 2420 and the inputted target temperature 2422 to the control apparatus 24 for storing. Furthermore, the human-machine interface 26 can receive an input that directly inputs the operation data or the candidate environmental factor 2424 from the user, and transfer the inputted operation data and the inputted candidate environmental factor 2424 to the control apparatus 24 for storing.

Figure 3:
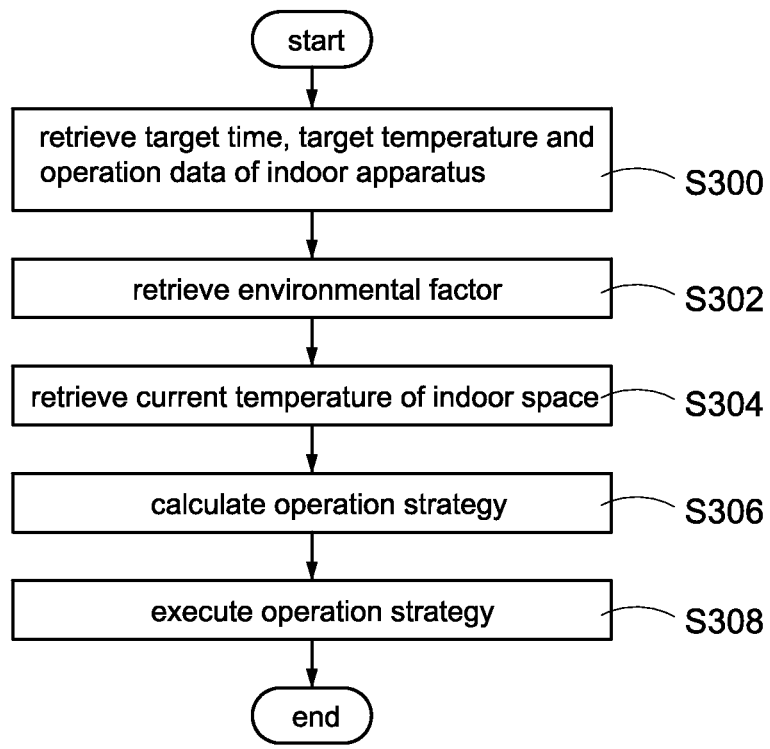
FIG. 3 is a flowchart of a temperature control method according to a first embodiment of the present disclosed example.

Next, please refer to FIG. 3 which is an architecture diagram of a temperature control method according to a first embodiment of the present disclosed example. The temperature control method of this embodiment is mainly used to the temperature control system shown in FIG. 2.

Step S300: retrieve the target time 2420, the target temperature 2422 and the operation data of the indoor space 20. Preferably, the control apparatus 24 can load the target time 2420, the target temperature 2422 and the operation data of the indoor space 20 from the memory unit 242. Or, the control apparatus 24 can receive the input that inputs the target time 2420, the target temperature 2422 and the operation data of the indoor apparatus 20 from the user via the human-machine interface 26 in which the operation data can comprise the operation powers and/or the temperature-adjusting capability values of the indoor apparatus 20 respectively operating under the operation modes.

Step S302: retrieve the environmental factor. Preferably, the control apparatus 24 can select the most suitable one from the candidate environmental factors stored in the memory unit 242 as the environmental factor. Or, the control apparatus 24 can calculate the environmental factor according to the heating status of the indoor space Z1 via executing the environmental factor calculation procedure 2402. Or, the control apparatus 24 can receive the input that directly inputted the environmental factor from the user.

Step S304: retrieve the current temperature of indoor space Z1. Preferably, the control apparatus 24 retrieves the current temperature of the indoor space Z1 via the temperature sensor 22.

Step S306: calculate the operation strategy. More specifically, the control apparatus 24 executes the operation strategy calculation procedure 2400 to calculate the operation strategy according to the target time 2420, the target temperature 2422, the operation powers of the operation data, the environmental factor and the current temperature in which the operation strategy is to minimize the total operation power that the indoor apparatus 20 consumes within the target time 2420. Preferably, the operation strategy comprises the plurality of the time values respectively corresponded to the plurality of operation time that the indoor apparatus 20 operates under each operation mode. The control apparatus 24 calculates the operation strategy according to the following formula.

$$(\text{current temperature} - \text{target temperature}) = \text{environmental factor} * \Sigma_{i=1}^{N}(\text{operation time}_i * \text{operation data}_i) \quad \text{(formula 1)}$$

Where each operation time$\geq 0$; $\Sigma_{i=1}^{N}(\text{operation time}_i)\leq$remaining time(remaining time=target time 2420−elapsed executed time)$\leq$target time 2420; a set of all the operation time is the operation strategy; the indoor apparatus 20 can switch the current mode between the N operation modes.

Please be noted that the operation data described in the formula 1 can only comprise the operation power corresponding to the operation mode or simultaneously comprise both the operation power corresponding to the operation mode and the temperature-adjusting capability value corresponding to the operation mode, but this specific example is not intended to limit the scope of the disclosed example.

The control apparatus 24 can calculate the plurality of the operation strategy according to the formula 1 in which each operation strategy comprises the time values corresponding to the operation modes. Then, the control apparatus 24 selects the best operation strategy from the calculated operation strategies according to the formula 2. The best operation strategy can be used to minimize the total operation power that the indoor apparatus 20 consumes. Above best operation strategy comprises the best operation time of each operation mode.

$$\text{Min}(\Sigma_{i=1}^{N}(\text{operation power}_i * \text{operation time}_i)) \quad \text{(formula 2)}$$

Step S308: execute operation strategy. Preferably, the control apparatus 24 executes the operation strategy calculated in the step S306. The control apparatus 24 control the indoor apparatus 20 to switch the current mode to one of the other difference modes by turns, and control the indoor apparatus 20 to operate within the operation time corresponding to the switched operation mode.

Figure 4:
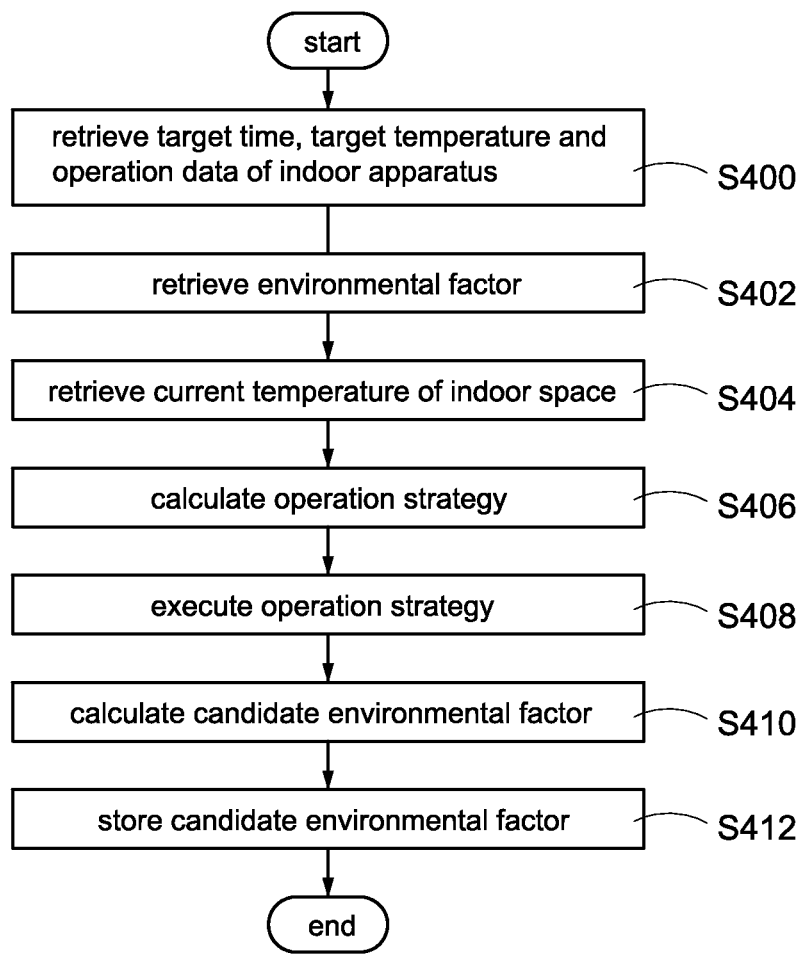
FIG. 4 is a flowchart of a temperature control method according to a second embodiment of the present disclosed example.

Next, please refer to FIG. 4 which is an architecture diagram of a temperature control method according to a second embodiment of the present disclosed example. The temperature control method of this embodiment is mainly used to the temperature control system shown in FIG. 2. In comparison to the first embodiment shown in FIG. 3, this embodiment implements the learning function of the environmental factor via adding a step S410 and a step S412. The steps S400-S408 shown in FIG. 4 are similar to the steps S300-S308 shown in FIG. 3 respectively, the relevant description is omitted for brevity.

Step S410: calculate candidate environmental factor. Preferably, after the temperature of the indoor space Z1 achieves the target temperature 2422, the control apparatus 24 can calculate the candidate environmental factor 2424 corresponding to the current execution environment (named the heating status of the indoor space Z1) and the executed operation strategy according to the executed operation strategy, the target time 2420, the target temperature 2422, the operation data and the formula 1.

Step S412: store candidate environmental factor. Preferably, the control apparatus 24 stores the calculated candidate environmental factor 2424 to the memory unit 242, which is provided to the temperature system 2 as the environmental factor in next operation.

Thus, the temperature control system 2 of this embodiment can calculate the candidate environmental factor 2424 corresponding to the current execution environment and the executed operation strategy every time when the execution of the operation strategy is finished. And if the execution environment next time operation is similar to the execution environment this time operation, the temperature control system 2 can directly select the stored candidate environmental factor 2424 as the environmental factor to fast calculate the operation strategy.

Figure 5:
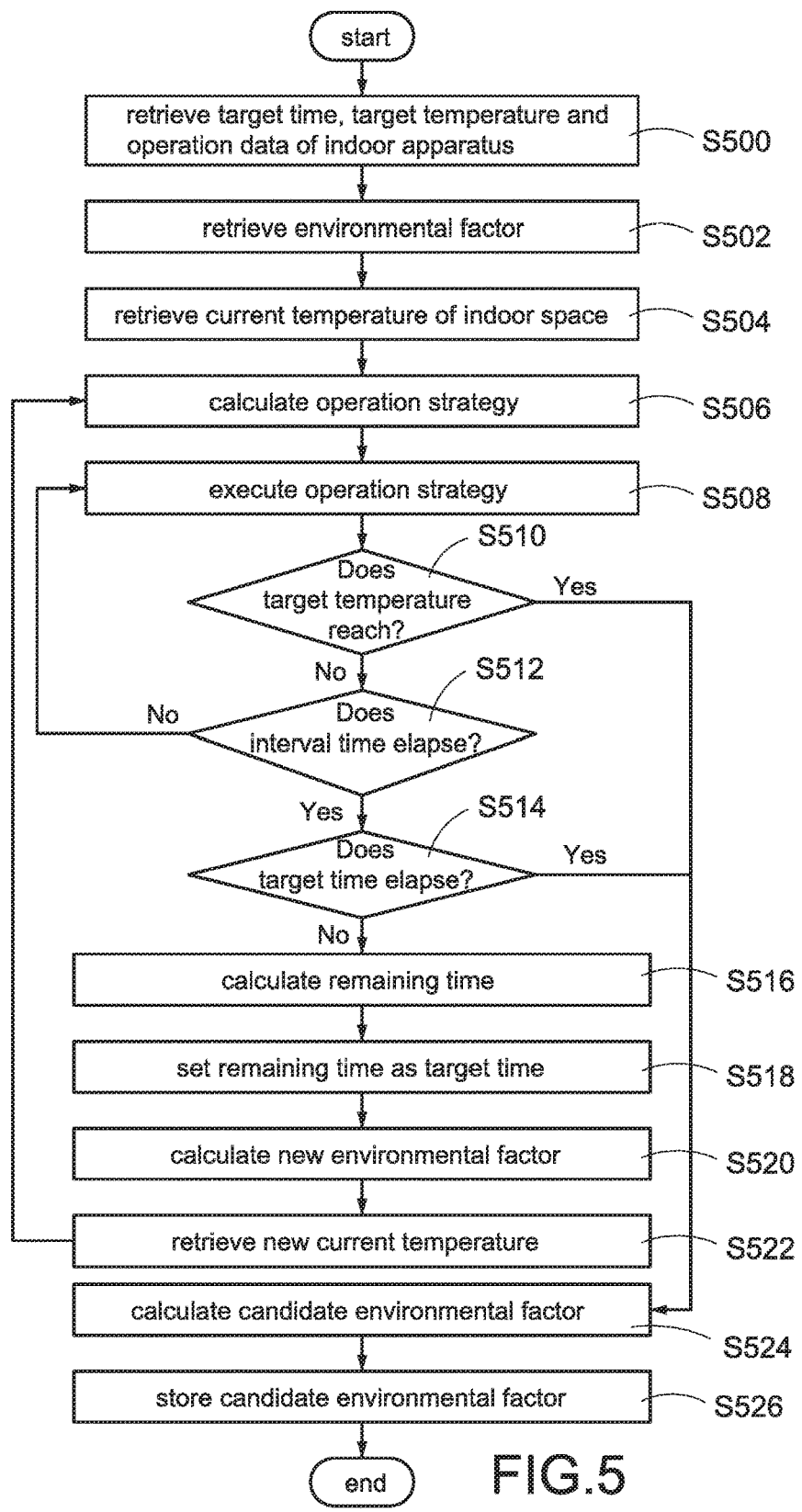
FIG. 5 is a flowchart of a temperature control method according to a third embodiment of the present disclosed example.

Next, please refer to FIG. 5 which is an architecture diagram of a temperature control method according to a third embodiment of the present disclosed example. The temperature control method of this embodiment is mainly used to the temperature control system shown in FIG. 2. Compare to the first embodiment shown in FIG. 3, this embodiment implements the real-time correction function of the executing operation strategy via adding the steps S510-S522. The steps S510-S522 shown in FIG. 5 are similar to the steps S300-S308 shown in FIG. 3 respectively, the relevant description is omitted for brevity.

To avoid confusion, in this embodiment, the target time 2420 retrieved in the step S500 is named the first target time. The environmental factor retrieved in the step S502 is named the first environmental factor. The current temperature retrieved in the step S504 is named the first current temperature. The operation strategy calculated in the step S506 is named the first operation strategy.

Step S510: determine whether the target temperature 2422 is reached? Preferably, when executing the step S508, the control apparatus 24 can compare the current temperature with the target temperature 2422 (the first target temperature) to determine whether the current temperature (the first current temperature) achieves the target temperature 2422.

Step S512: determine whether the interval time elapses. Preferably, the control apparatus 24 counts whether the interval time elapses via the counter 244. The interval time can be pre-configured by the system or be inputted via the human-machine interface 26 by the user, but this specific example is not intended to limit the scope of the disclosed example. If the interval time elapses, the step S514 is performed; if the interval time does not elapse, the step S508 is repeatedly performed.

Step S514: determine whether the target time 2420 elapses. Preferably, the control apparatus 24 counts whether the target time 2420 elapses via the counter 244. If the target time 2420 elapses, the step S524 is performed to calculate the environment factor 2424 corresponding to the execution environment this time operation; if the interval time does not elapse, the step S508 is repeatedly performed.

Step S516: calculate the remaining time. Preferably, the control apparatus 24 subtracts the interval time from the target time 2420 to obtain the remaining time.

Step S518: set the remaining time as the target time 2420. Preferably, the control apparatus 24 sets the remaining time calculated in the step S516 as target time (named a second target time). In other words, the control apparatus 24 sets the remaining time as the new target time 2420.

Step S520: calculate the new environmental factor. More specifically, the control apparatus 24 re-executes the environmental factor calculation procedure 2402 to calculate the new environmental factor (named a second environmental factor) according to the current heating status of the indoor space Z1 after the interval time elapses. Preferably, the control apparatus 24 calculates the new environmental factor according to the operation strategy executed by the control apparatus 24 in the past (such as the elapsed interval time), the retrieved target time 2420, the retrieved target temperature 2422, the retrieved operation data and the formula 1.

Step S522: retrieve the new current temperature. Preferably, the control apparatus 24 re-retrieves the current temperature (named that a second current temperature) via the temperature sensor 22, re-performs the step S506, and re-performs the operation strategy calculation procedure 2400 to calculate the new operation strategy (named a second operation strategy) according to the new environmental factor (named the second environmental factor), the new current temperature (named the second current temperature) and the new target time 2420.

Thus, the temperature control method of this embodiment can have a real-time correction function of real-time correcting the operation strategy in response to the change of the heating status of the indoor space Z1 (such as a large number of peoples suddenly enter to the indoor space Z1) in the process of executing the cooling/heating operation. The temperature control method of this embodiment can ensure that the temperature of the indoor space Z1 achieves the target temperature 2422 within the target time 2420.

Please be noted that there isn't order relationship between steps S516-S520. The people having the ordinary skill in the art of the present disclosed example can arbitrarily change the order of above steps according to the requirements.

If the control apparatus 24 determine that the target temperature is achieved in the step S510 or the target time 2420 elapses in the step S514, the control apparatus 24 performs the step S524.

Step S524: calculate the candidate environmental factor.
Step S526: store the candidate environmental factor.

The present disclosed example can make the indoor apparatus operate with the most energy saving way in the fast cooling/heating phase, and can ensure that the temperature of the indoor space achieves the target temperature within the target time.

The foregoing descriptions of embodiments of the disclosed example have been presented only for purposes of illustration and description. They are not intended to be exhaustive or to limit the disclosed example to the forms disclosed. Accordingly, many modifications and variations will be apparent to practitioners skilled in the art. Additionally, the above disclosure is not intended to limit the disclosed example. The scope of the disclosed example is defined by the appended claims.

What is claimed is:

1. A temperature control system changing a temperature of an indoor space to a target temperature within a target time, the temperature control system comprising:
an indoor apparatus adjusting the temperature of the indoor space, the indoor apparatus being operable in a plurality of operation modes respectively corresponding to a plurality of operation powers;
a temperature sensor sensing a current temperature of the indoor space; and
a control apparatus connected to the indoor apparatus and the temperature sensor, comprising a memory unit, the memory unit storing a plurality of candidate environmental factors, the control apparatus selecting one of the candidate environmental factors as an environmental factor, executing an operation strategy calculation procedure to calculate an operation strategy according to the target time, the target temperature, an operation data of the indoor apparatus, the current temperature and the environmental factor, and executing the operation strategy to control the indoor apparatus to switch a current mode of the indoor apparatus between the operation modes for minimizing a total operation power that the indoor apparatus consumes within the target time.

2. The temperature control system of claim 1, further comprising:
a human-machine interface operatively connected to the control apparatus and receiving an input operation that inputs the target time and the target temperature.

3. The temperature control system of claim 1, wherein the control apparatus calculates the candidate environmental factor according to the executed operation strategy, the target time, the target temperature and the operation data after the temperature of the indoor space achieves the target temperature, and the control apparatus stores the calculated candidate environmental factor to the memory unit.

4. The temperature control system of claim 1, wherein the control apparatus executes an environmental factor calculation procedure according to a heating status of the indoor space for calculating the environmental factor.

5. The temperature control system of claim 4, wherein the control apparatus comprises a counter counting an interval time, after the interval time elapses, the control apparatus re-executes the environmental factor calculation procedure for calculating the new environmental factor, calculates a remaining time according to the interval time and the target time, sets the remaining time as the new target time, and re-executes the operation strategy calculation procedure to calculate the new operation strategy according to the new environmental factor and the new target time.

6. The temperature control system of claim 1, wherein the operation strategy comprises a plurality of the time values, the time values are respectively corresponded to a plurality of operation time that the indoor apparatus operates under each operation mode, and a sum of the time values is not greater than the target time.

7. A temperature control method changing a temperature of an indoor space to a target temperature within a target time, the temperature control method comprising:
a) retrieving the target time, the target temperature and an operation data of an indoor apparatus, wherein the indoor apparatus being operable in a plurality of operation modes respectively corresponding to a plurality of operation power;
b) selecting one of a plurality of pre-stored candidate environmental factors as an environmental factor;
c) retrieving a current temperature of the indoor space;

d) calculating an operation strategy according to the target time, the target temperature, the operation data, the environmental factor and the current temperature, wherein the operation strategy is used for minimizing a total operation power that the indoor apparatus consumes within the target time; and e) executing the operation strategy to control the indoor apparatus to switch a current mode of the indoor apparatus between the operation modes.

8. The temperature control system of claim 7, further comprising:

f) calculating the candidate environmental factor according to the executed operation strategy, the target time, the target temperature and the operation data; and g) storing the calculated candidate environmental factor.

9. The temperature control system of claim 7, wherein the step a) is to calculate the environmental factor according to a heating status of the indoor space.

10. The temperature control system of claim 7, wherein the operation data comprises a plurality of temperature-adjusting capability values respectively corresponding to the operation modes; the step a) is to calculate the operation strategy according to the target time, the target temperature, the operation data, the environmental factor, the current temperature and the temperature-adjusting capability values.

11. The temperature control system of claim 7, wherein the operation strategy comprises a plurality of the time values, the time values are respectively corresponded to a plurality of operation time that the indoor apparatus operates under each operation mode, and a sum of the time values is not greater than the target time.

12. A temperature control method changing a temperature of an indoor space to a target temperature in a target time, the temperature control method comprising:

a) retrieving the first target time, the target temperature and a operation data of an indoor apparatus, wherein the indoor apparatus being operable in a plurality of operation modes respectively corresponding to a plurality of operation power;

b) retrieving a first environmental factor;

c) retrieving a first current temperature of the indoor space;

d) calculating an operation strategy according to the first target time, the target temperature, the operation data, the first environmental factor and the first current temperature, wherein the first operation strategy is used for minimizing a total operation power that the indoor apparatus consumes within the first target time;

e) executing the operation strategy to control the indoor apparatus to switch a current mode of the indoor apparatus between the operation modes;

f) calculating a remaining time according to an interval time and the first target time after the interval time elapses and the first target time doesn't elapse;

g) calculating a second environmental factor after the step f);

h) retrieving a second current temperature after the step f);

i) making the remaining time as a second target time; and j) re-performing the step d) to calculating a second operation strategy according to the second environmental factor, the second current temperature and the second target time.

13. The temperature control system of claim 12, wherein the step a) is to select one of the pre-stored candidate environmental factors as the environmental factor.

14. The temperature control system of claim 13, further comprising:

k) calculating the candidate environmental factor according to the executed first operation strategy, the executed second operation strategy, the first target time, the second target time, the target temperature and the operation data after detecting the temperature of the indoor space achieving to the target temperature; and g) storing the calculated candidate environmental factor.

15. The temperature control system of claim 12, wherein the step a) is to calculate the first environmental factor according to a heating status of the indoor space.

16. The temperature control system of claim 12, wherein the operation data comprises a plurality of temperature-adjusting capability values respectively corresponding to the operation modes; the step a) is to calculate the first operation strategy according to the first target time, the target temperature, the operation data, the first environmental factor, the first current temperature and the temperature-adjusting capability values.

17. The temperature control system of claim 16, wherein each temperature-adjusting capability value is a difference value between an intake air-flowing temperature and an outlet air-flowing temperature of the indoor apparatus operating under the operation mode corresponding to the temperature-adjusting capability value.

18. The temperature control system of claim 12, wherein the first operation strategy comprises a plurality of the time values, the time values are respectively corresponded to a plurality of operation time that the indoor apparatus operates under each operation mode, and a sum of the time values is not greater than the first target time.

* * * * *